Nov. 22, 1955    J. H. ROSE    2,724,291
DRIVE ASSEMBLY

Filed Feb. 18, 1954    2 Sheets-Sheet 1

James H. Rose
INVENTOR.

BY *Clarence A. O'Brien*
*and Harvey B. Jacobson*
Attorneys

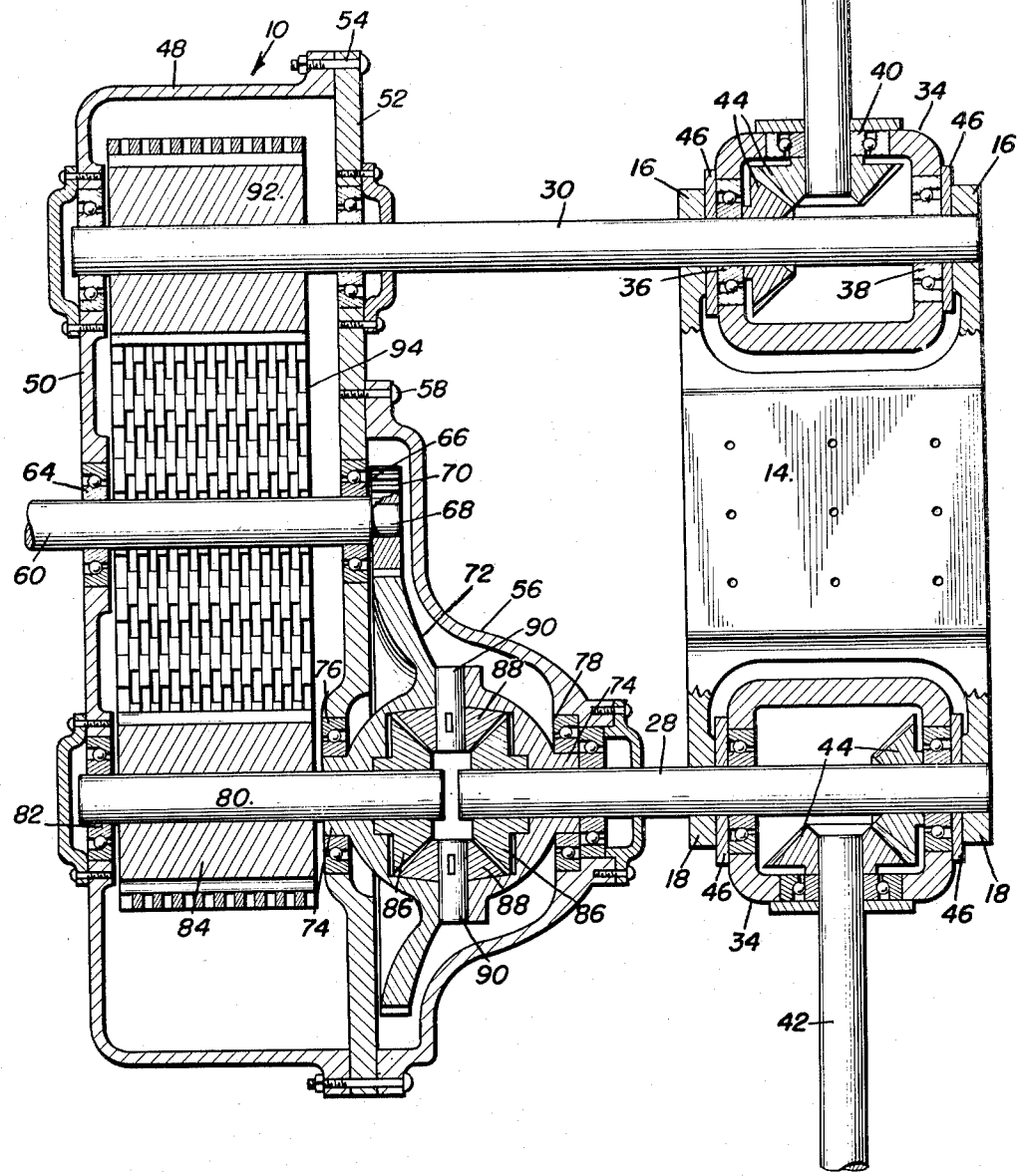

United States Patent Office 2,724,291
Patented Nov. 22, 1955

2,724,291
DRIVE ASSEMBLY

James H. Rose, River Grove, Ill.

Application February 18, 1954, Serial No. 411,107

5 Claims. (Cl. 74—710)

This invention relates generally to improvements in drive assemblies, and pertains more particularly to an improved final drive mechanism for vehicles.

A primary object of this invention is to provide an improved form of final drive assembly for vehicles which is of extremely compact design and may be constructed with a minimum of cost.

Another object of this invention is to provide a final drive assembly incorporating a transfer assembly and an axle mounting assembly, the same being so constructed as to permit independent suspension of the driving wheels of a vehicle, the mechanism utilizing common elements to simultaneously effect the drive and mount the axle members for independent vertical swinging movement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a horizontal sectional view showing details of the entire final drive assembly on an enlarged scale.

Figure 1:
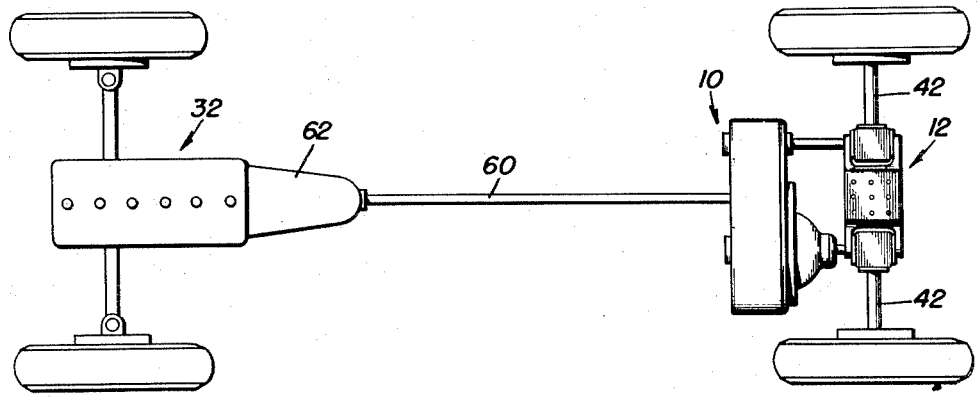
Figure 1 is a diagrammatic plan view illustrating a vehicle incorporating the improved final drive assembly.

Referring now more particularly to the drawings, reference numeral 10 is utilized to designate a transfer assembly while the reference numeral 12 is utilized to indicate the wheel mounting assembly, these two assemblies forming together the improved final drive arrangement.

Figure 3:
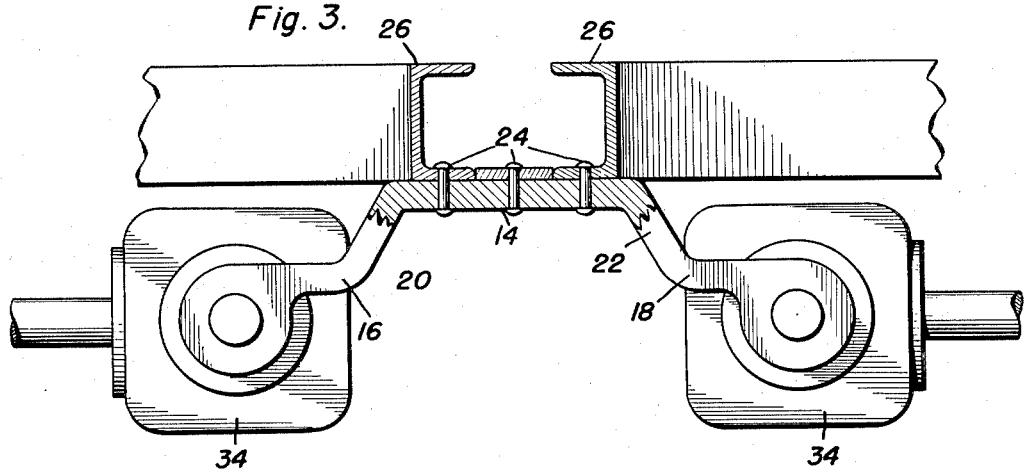
Figure 3 is an enlarged elevational view partly in section showing the manner in which the wheel mounting assembly is secured to a vehicle frame.
Figure 2:
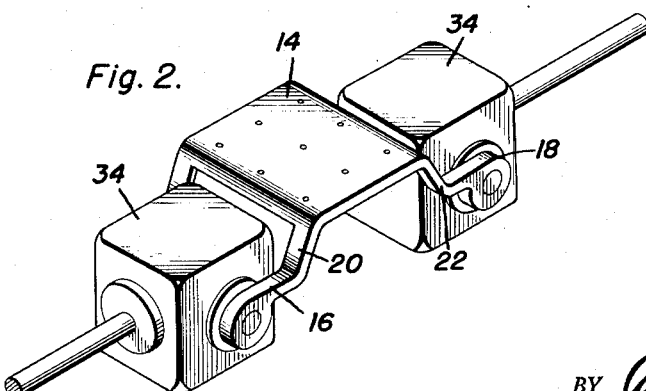
Figure 2 is a perspective view of the axle mounting assembly.

Referring now more particularly to Figures 2, 3 and 4, it will be seen that the wheel mounting assembly comprises a mounting plate portion 14 and the furcations or spaced ears 16 and 18 disposed at opposite sides thereof and joined thereto by means of the downwardly angulated portions 20 and 22. The mounting plate is provided with a plurality of apertures for receiving suitable fastening elements 24 by means of which the mounting plate is rigidly attached to frame members 26 of an associated vehicle provided for this purpose.

Each of the pairs of ears 16 and 18 is provided with aligned apertures which rotatably receive the first and second output shafts 28 and 30. The output shafts, as more fully described hereinafter, are drivingly connected to the engine 32 of the vehicle, and it will be manifest that any suitable bearing means may be provided in the ears for journaling these shafts. Between each pair of ears is a gear box 34 provided with bearing members 36 and 38 in opposite side walls thereof rotatably receiving the respective output shafts and a further bearing means 40 in an intermediate side wall rotatably receiving one end of each of the corresponding axles 42. A pair of miter gears are secured, respectively, to each corresponding output shaft and axle within the gear boxes for effecting rotation of the axles, as will be readily apparent. Spacer thrust washers 46 are positioned between the gear boxes and the ears 16 and 18 around the output shafts to reduce end play of the gear boxes to a practical minimum.

Referring now more particularly to Figure 4, the transfer assembly will be seen to consist of a housing incorporating a peripheral wall portion 48 and a side wall 50 integral therewith, as well as a removable cover plate 52 at the opposite side thereof. Any suitable fasteners 54 may be utilized in removably securing the cover plate to the main body portion of the housing. The housing also includes the cap member 56 removably secured, as by fasteners 58, to the cover plate 52, the purpose of this construction being presently apparent.

A drive shaft 60 extending from the transmission assembly 62 projects through the opposite side walls of the housing assembly, suitable bearing members 64 and 66 being provided therefor, and terminates in a reduced end portion 68 exteriorly of the housing upon which a pinion 70 is secured in any suitable manner adjacent the cover plate 52 and within the confines of the cap member 56. A differential gear and carrier assembly, which is indicated generally by the reference character 72, is provided with circular hub portions 74 which are journaled by means of bearing members 76 and 78 in the cover plate 52 and the cap 56, respectively. The hubs 74 are provided with longitudinal bores and one hub journals an end of lay shaft 80, the opposite end of which is journaled in the side wall 50 of the housing by means of a suitable bearing 82, a sprocket 84 being secured to the lay shaft between the opposite side walls of the housing. The bore in the other hub 74 rotatably receives one end of the previously mentioned output shaft 28 such that the same is coaxial with the lay shaft 80 and each is provided with a differential side gear 86 in the manner shown. Differential pinion gears 88 are secured on short stub shafts 90 rotatably received in the carrier assembly and meshing with the side gears 86 to effect a differential drive from the drive shaft 60 to the lay shaft 80 and the output shaft 28. To effect rotation of the other output shaft 30, the same is provided with a sprocket member 92 and a chain 94 extends over this sprocket and the sprocket of the lay shaft to effect drive therebetween.

By the above described assemblies, it will be readily apparent that an extremely compact form of final drive mechanism is effected and that the output shafts 28 and 30 not only serve the function of imparting final drive to the axles but also to pivotally suspend the same for vertical swinging motion relative to the vehicle independent of one another. The rear axle assembly may be removed from the vehicle as a unit by merely providing a coupling in the drive shaft 60 between the assembly 10 and the transmission 62.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a vehicle drive assembly, a housing adapted to be rigidly secured to a vehicle frame, a drive shaft journaled in said housing and having a pinion gear thereon, a differential gear journaled in said housing and meshing with said pinion, a pair of spaced, opposed differential pinions rotatably carried by said differential gear, a pair of spaced, opposed differential side gears meshing with both of said differential pinions, a first output shaft connected at one end to one of said side gears and extending from said housing in parallelism to said drive shaft, a lay shaft journaled in said housing coaxially of said first output shaft and connected to the other of said side gears, a second output shaft journaled in said housing and extending therefrom parallel to the first output shaft, said first and second output shafts being disposed on opposite sides of said drive shaft, and means drivingly interconnecting said lay shaft and said second output shaft.

2. In a vehicle drive assembly, a housing adapted to be rigidly secured to a vehicle frame, a pair of spaced, parallel output shafts journaled in and projecting from said housing, a drive shaft journaled in said housing between said output shafts, a lay shaft journaled in said housing coaxially with one of said output shafts, differential mechanism driven by said drive shaft and connected to said one output shaft and said lay shaft for differentially driving the same, and means drivingly connecting the other output shaft and said lay shaft.

3. A final drive assembly for vehicles, comprising a transfer assembly and an axle mounting assembly, said assemblies being adapted for mounting in longitudinally spaced relation on a vehicle frame, said transfer assembly including a housing, a pair of spaced, parallel output shafts journaled in and projecting from said housing, a drive shaft journaled in said housing between said output shafts, a lay shaft journaled in said housing coaxially with one of said output shafts, differential mechanism driven by said drive shaft and connected to said one output shaft and said lay shaft for differentially driving the same, and means drivingly connecting the other output shaft and said lay shaft, and said axle mounting assembly including a pair of axle members, and means including portions of said output shafts mounting said axle members for vertical swinging movement on said axle mounting assembly.

4. A final drive assembly for vehicles, comprising a transfer assembly and an axle mounting assembly, said assemblies being adapted for mounting in longitudinally spaced relation on a vehicle frame, said transfer assembly including a housing, a pair of spaced, parallel output shafts journaled in and projecting from said housing, a drive shaft journaled in said housing between said output shafts, a lay shaft journaled in said housing coaxially with one of said output shafts, differential mechanism driven by said drive shaft and connected to said one output shaft and said lay shaft for differentially driving the same, and means drivingly connecting the other output shaft and said lay shaft, and said axle mounting assembly including a pair of axle members, means drivingly interconnecting each one of said output shafts with a corresponding axle member, and means including portions of said output shafts mounting said axle members for vertical swinging movement on said axle mounting assembly.

5. A final drive assembly for vehicles, comprising a transfer assembly and an axle mounting assembly, said assemblies being adapted for mounting in longitudinally spaced relation on a vehicle frame, said transfer assembly including a housing, a pair of spaced, parallel output shafts journaled in and projecting from said housing, a drive shaft journaled in said housing between said output shafts, a lay shaft journaled in said housing coaxially with one of said output shafts, differential mechanism driven by said drive shaft and connected to said ont output shaft and said lay shaft for differentially driving the same, and means drivingly connecting the other output shaft and said lay shaft, said axle mounting assembly including a mounting plate, a pair of spaced, apertured ears disposed at each side of said plate, a gear box positioned between each pair of ears, an output shaft journaled in each pair of ears and projecting through each associated gear box whereby the gear boxes are swivelly mounted between the ears, an axle journaled within and extending from each of said gear boxes, means drivingly interconnecting each of said output shafts and an associated axle, and means for differentially driving said output shafts.

References Cited in the file of this patent
UNITED STATES PATENTS

| | | |
|---|---|---|
| 1,273,412 | Salisbury | July 23, 1918 |
| 1,502,089 | Daimler | July 22, 1924 |
| 1,920,175 | Hollos | Aug. 1, 1933 |
| 2,007,670 | Zubaty | July 9, 1935 |
| 2,196,556 | Hollos | Apr. 9, 1940 |
| 2,267,562 | Higgin | Dec. 25, 1941 |
| 2,858,773 | Gurney | May 17, 1952 |